Figure 1:
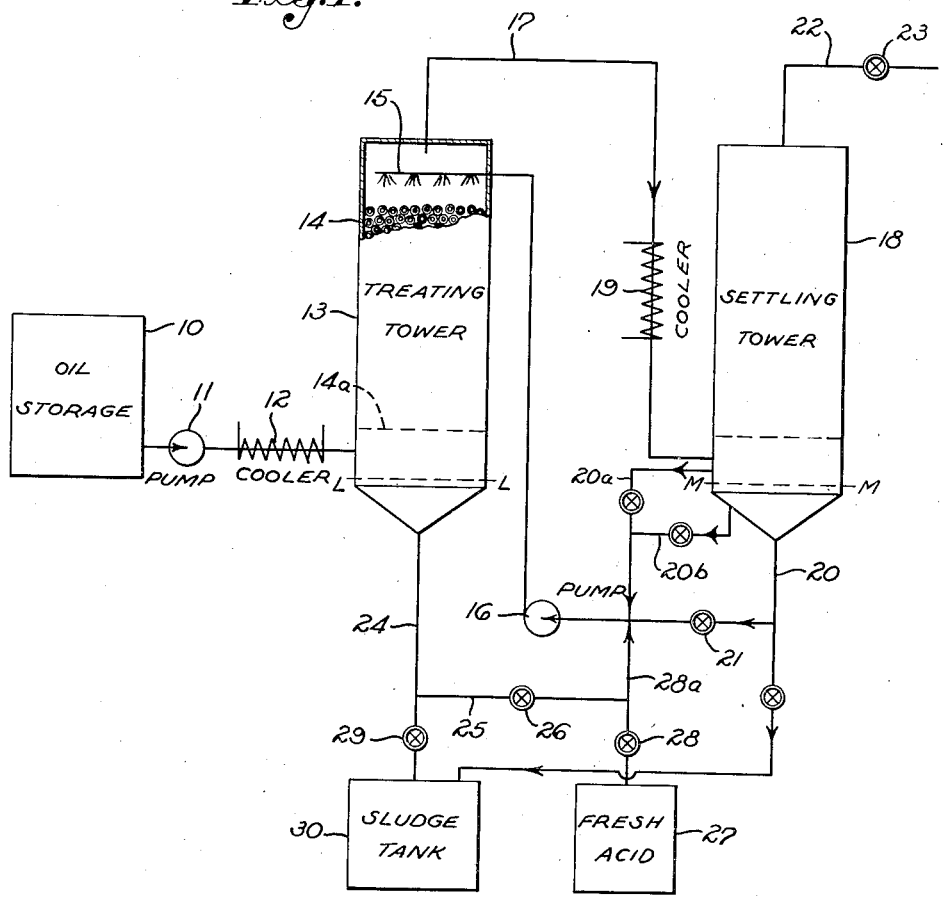

April 18, 1939. T. O. EDWARDS, JR., ET AL 2,155,007
SULPHURIC ACID TREATMENT OF OILS
Filed Aug. 17, 1936 3 Sheets-Sheet 1

INVENTORS
T. O. EDWARDS, Jr.
D. D. STARK
By Charles L. Stokes
ATTORNEY.

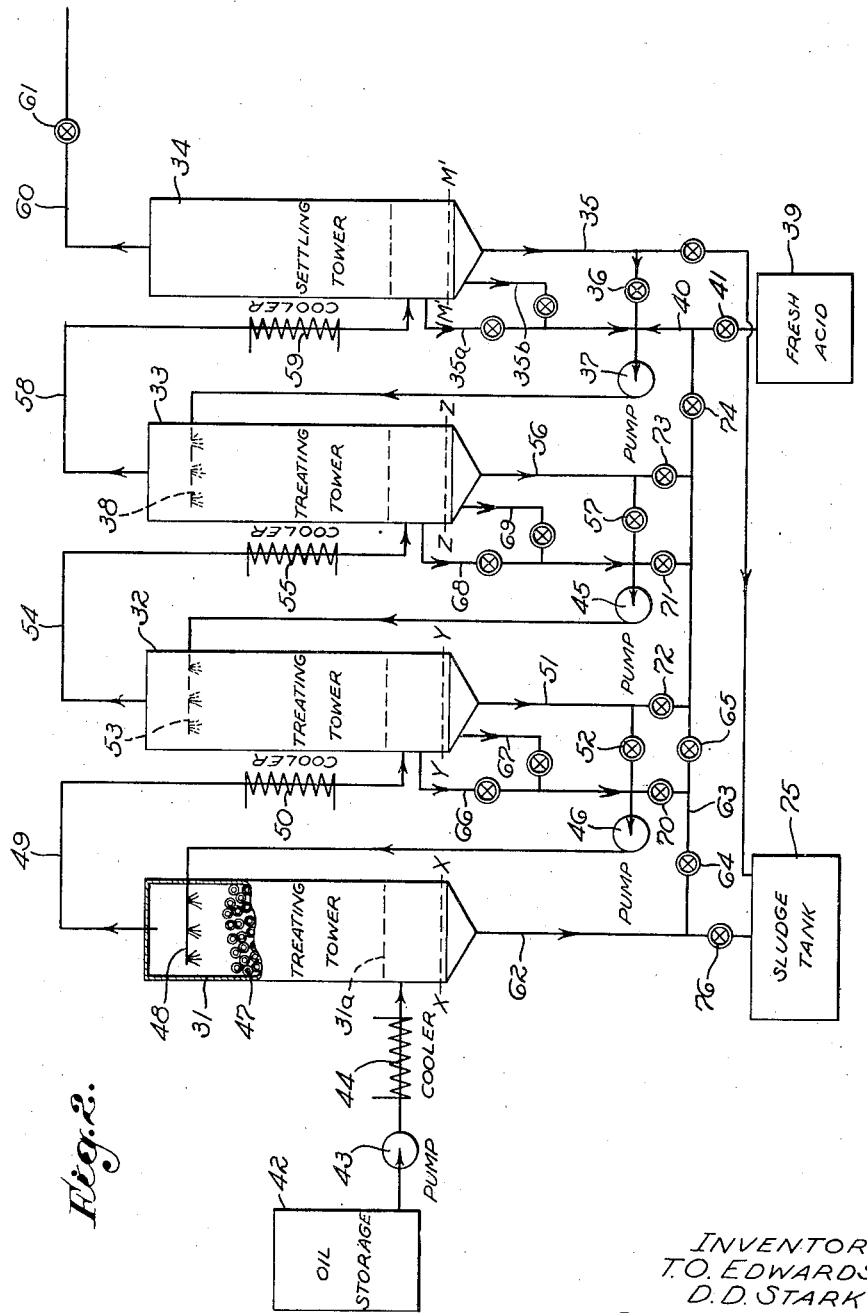

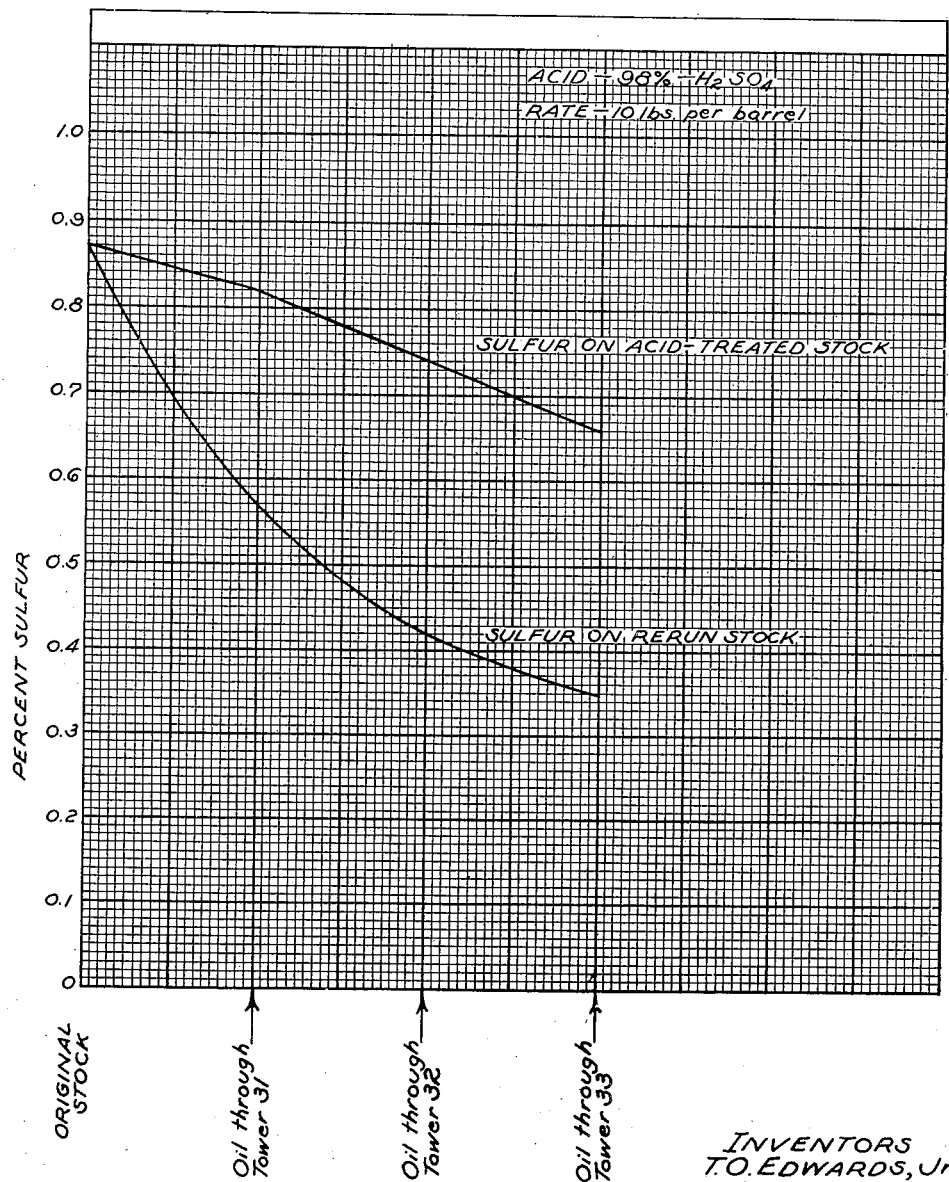

Patented Apr. 18, 1939

2,155,007

UNITED STATES PATENT OFFICE 2,155,007

SULPHURIC ACID TREATMENT OF OILS

Thomas Oliver Edwards, Jr., Associated, and David Dewey Stark, Watson, Calif., assignors, by mesne assignments, to Tide Water Associated Oil Company, San Francisco, Calif., a corporation of Delaware Application August 17, 1936, Serial No. 96,408

6 Claims. (Cl. 196—40)

This invention relates to improvements in treating hydrocarbon oils for the removal of sulphur and other undesirable constituents, such as those which are gum forming and those which cause color instability, and is particularly adapted to the treatment of petroleum and its distillates, especially the gasoline fractions derived from cracked petroleum, with sulphuric acid.

The generic form of the invention has been disclosed and claimed in our co-pending application, Serial No. 532,000, filed April 22, 1931, now Patent 2,052,852, and the present invention is a continuation-in-part of said application.

The removal of sulphur from petroleum to a commercially feasible low figure by the use of sulphuric acid has heretofore presented many difficulties broadly solved in our said co-pending application, but the present invention comprehends improvements in the mode of operation providing for sulphur removal to a still lower figure coupled with decreased losses of valuable hydrocarbons.

This is accomplished by the selective polymerization of the sulphur bearing compounds in petroleum or its distillates effected by the application of sulphuric acid to the petroleum under controlled temperature conditions during a predetermined period of contact. Under said controlled temperature conditions sludges of improved fluidity are produced and the oxidizing action of the sulphuric acid with subsequent generation of large volumes of $SO_2$ is minimized, thus preventing increased and uncontrolled velocities throughout the system.

It should be emphasized that the herein described removal of undesired sulphur compounds from the petroleum selected for treatment is effected by selective sulphonation and polymerization, the latter feature being of major importance. In so operating, the polymerization and sulphonation of desired non-sulphur bearing unsaturated hydrocarbons is minimized and, in consequence, the total yield is appreciably increased.

The contacting of sulphuric acid, or acid sludge, with a designated oil, such as cracked gasoline, for the removal of sulphur compounds is preferably best accomplished in a true countercurrent flow system, such as described in our aforesaid co-pending application, and suitable apparatus embodying a mode of operation is shown in the accompanying diagrammatic sheet of drawings.

Referring to Fig. 1, a selected petroleum oil, such as cracked gasoline or pressure distillate which may or may not have been previously treated in known ways for the removal of impurities, is supplied from storage 10 to a pump 11 which forces a predetermined stream of the oil at a certain velocity through a cooler 12 into the lower portion of a treating tower 13.

The tower 13 may be one of a series of similar towers filled with suitable contact material 14 to a degree sufficient to assure effective contact of the oil with the sulphuric acid, or acid sludge, used and the capacity of tower 13 may be such that the entire contacting may taken place in one large tower, or a similar capacity may be acquired by a plurality of towers in series, as later described. Due to construction questions in which economy is a factor, the use of a series of towers is preferred.

The contact material 14 used in tower 13 may comprise Raschig rings of predetermined size, such as 1 in. diameter, to provide efficient contacting of oil and acid compatible with a predetermined flow rate and such contact rings may be supported in the usual fashion on a perforated screen or plate 14a. Other suitable contact material may be used, such as sized gravel, crushed rock, glass beads, and the like, all such material being preferably wetted by the acid rather than by the oil.

As illustrative of a single tower mode of operation, the acid or acid sludge is supplied to a pump 16 which connects with spray 15 and the acid sludge is dispersed in fine particles by pump 16 in the presence of a relatively large volume of the oil taken after treatment and returned to the treating tower for such dispersal purposes and for the purpose of temperature control.

The mixture of oil and acid sludge is conveyed through spray 15 to the upper part of tower 13 wherein the velocity of the combined stream is reduced to permit separation of the acid sludge particles and deposition on the contact material 14 to descend by gravity in countercurrent flow through tower 13 against the uprising oil.

The normal flow of oil from cooler 12 through tower 13 is taken off through line 17 and is augmented in volume by the oil passed through spray 15 with the acid sludge from pump 16. In its passage to settling tower 18 the oil is cooled by means of a cooler 19 to the desired temperature. A relatively large volume of this precooled oil is supplied through line 20, controlled by valve 21 into the suction of pump 16, wherein it is mixed with fresh acid and enters the preceding tower 13 through spray 15; the remaining portion of the oil approximately equal to the raw oil charged by pump 11 passes upward through tower 18 leaving through line 22 controlled by a pressure regulating valve 23. Settling tower 18 may be of the same construction and have the same filling as tower 13.

In the special case of single tower operation on highly unsaturated pressure distillate, or cracked distillate, such as vapor phase gasoline, the reactivity of strong acid is too great and results in excessive treating losses. Under such conditions the chemical reactivity may be modified by admixture within the system with acid sludge. Under such a mode of operation a sludge level L—L is maintained below the gasoline inlet in tower 13 and the sludge formed in whole or in part passed through lines 24 and 25, the rate being controlled by valve 26, and mixed with fresh acid from supply tank 27, the rate of supply of the fresh acid being controlled by valve 28, and the mixture is then injected into the suction of pump 16 accompanied by relatively large volumes of precooled oil passed through line 20 and control valve 21, through spray 15 to the upper part of tower 13. Excess sludge formed and not desired for use may be withdrawn through valve 29 to sludge tank 30.

The preferred mode of operation utilizing multiple treating towers in series is shown in Fig. 2. The system diagrammatically illustrating three acid treating towers 31, 32, and 33, and one settling tower 34, may be composed of two or more acid treating towers.

The three acid towers 31, 32, and 33 may be identical in construction and operation, being partially filled with suitable contact material suitably supported as described under single tower operation on screens 31a. The settling tower 34 is likewise partially filled with contact material acting as a coagulating medium to collect any acid sludge material which may be carried by the treated gasoline. This sludge settles downward and may be transferred through line 35, valve 36, to a pump 37 which passes the sludge back to tower 33 through a spray 38 together with a relatively large volume of oil and a predetermined amount of fresh acid supplied from tank 39 and line 40, through valve 41, as previously described.

The system is essentially countercurrent in that raw oil is transferred from storage 42 by pump 43 through cooler 44 to one end of the system while fresh acid is injected into the suction of circulating pump 37 under conditions of high oil circulation rates and the mixture enters the acid surface contacting towers through spray 38. The oil passes progressively into the bottom of each of the towers and out the top, whereas the acid sludge is pumped backward in the opposite direction by means of the circulating pumps 37, 45, and 46 between the towers. The oil and treating medium thus flow countercurrent to each other.

To describe the exact flow, raw oil from pump 43 is precooled to the desired treating temperature by means of cooler 44 and enters near the base of tower 31 wherein it flows upward through contact material 47, countercurrent to acid sludge which has been delivered to tower 31 by pump 46 in admixture with a relatively large volume of precooled oil from the bottom of the succeeding tower 32. The acid sludge is settled over the top of contact material 47 by spray 48 in a finely dispersed state in the above mentioned circulated oil. The oil charge augmented by this circulated oil passes through line 49 to the lower part of tower 32, being cooled in passage by cooler 50.

From the free space at the base of tower 32, a portion of the oil is withdrawn with acid sludge which has been coagulated and settled by gravity in tower 32 through line 51 and is then circulated by means of pump 46 back to the top of tower 31, the volume being controlled by valve 52. The remaining oil, roughly approximately equivalent in volume to the once treated charge, passes upward countercurrent to acid sludge of increasing reactivity, which has been supplied to the top of tower 32 through spray 53 by means of pump 45 with a high ratio of precooled oil from the succeeding tower 33. The oil, augmented as in the preceding tower 31 by the circulated oil, leaves tower 32 through line 54 being cooled by cooler 55 before entry into tower 33.

The oil in the free space at the base of tower 33, as in the preceding cases, is divided into two portions, one of which may be circulated in order to control a high ratio of oil to acid sludge through line 56 controlled by valve 57 and pump 45 to tower 32. The partially treated oil from the top of tower 32 is passed upward countercurrent to acid sludge in tower 33 and meets fresh acid which has been supplied to the top of tower 33 through spray 38 in admixture with large ratios of precooled oil circulating from settling tower 34 through line 35 and pump 37 to tower 33. The fresh acid from tank 39 is supplied through control valve 41 and line 40 to the suction of said circulating pump 37.

The stream of oil, on reaching the top of tower 33, is augmented as described with circulated oil from the succeeding tower and leaves through line 58 to settling tower 34 being precooled in cooler 59. As in the preceding tower, a portion is circulated back and in this way the oil charge which has been acid treated in three towers passes upward through contact material which in this case acts as a coagulating medium to separate finely divided sludge which may be carried with the oil. This coagulated sludge settles to the bottom of tower 34 and is transferred with the circulating gasoline through line 35 and pump 37 to the top of tower 33.

The acid treated oil leaves tower 34 by means of line 60 and control valve 61 and is then subjected to the usual finishing processes as water washing, and caustic neutralization, the mechanics of which are common in the art. Acid treated oil in the single tower operation (refer to Fig. 1) leaving settling tower 18 through line 22 is also subjected to the above mentioned finishing procedure before the rerunning distillation operation for the removal of polymerized compounds.

As in the special case mentioned under single tower operation, in which it may be advantageous to mix the fresh acid with acid sludge, the same may be accomplished in multiple tower operations in the following manner:

Sluge levels X—X, Y—Y, and Z—Z may be permitted to form in the lower part of towers 31, 32, and 33 respectively and line 62 permits the withdrawal of sludge from tower 31 to be passed to a header 63, controlled by valves 64 and 65, for distribution as desired to any or all of the circulating pumps 37, 45, and 46 for use in the described manner.

For closer control of regulated ratios of oil to acid sludge, valve controlled lines 66 and 67 may lead from above and below the sludge level Y—Y in tower 32 to the suction side of pump 46 and likewise valve controlled lines 68 and 69 may lead from above and below the sludge level Z—Z in tower 33 to the suction side of pump 45, in the event that the total sludge is not desired to be withdrawn through lines 51 and 56 from towers 32 and 33 respectively.

Crossovers 70 and 71 are provided to pass sludge from tower 31 to either tower 32 or 33 or both and crossovers 72 and 73 are provided to pass sludge back to pump 37, or valve 74 may be closed to pass unrequired sludge back to sludge tank 75. Likewise by manipulating valves 76, 64, and 65 and the other described valves, sludge may be passed from any and all of the towers 31, 32 and 33 to sludge tank 75.

The arrangement of lines and valves described is such as to assure the maximum utilization of the acid sludge in the system in order to effect the highest degree of selective polymerization without undue sulphonation and at the same time to provide for continuous countercurrent contacting and temperature control.

To this end, it is obvious that acid sludge may be passed from one tower to another as efficiency may require.

With the above described flows, a preferred selective sulphonation and polymerization of sulphur compounds without excessive sulphonation and polymerization of non-sulphur bearing unsaturated hydrocarbons may be effected either in a single tower of somewhat excessive height, or preferably in multiple towers, by contacting the acid and acid sludge, in true countercurrent flow with the oil to give a predetermined time of contact by the use of proper contact material under controlled temperature conditions.

Temperature control is important, first, to allow the selective polymerization action of the sulphuric acid and acid sludge on the undesirable constituents such as sulphur compounds, second, to maintain a desired fluidity of the acid sludge to allow the effective utilization of the acid values thereof, and, third, to prevent excessive oxidizing action of the acid and the resultant production of large volumes of $SO_2$, the latter having a deterrent effect in increasing velocities throughout the system which thus may disturb the desired equilibrium in operation.

If it be assumed that a single tower is to be used, refer to Fig. 1. The oil is cooled on passing through cooler 12 to a desired temperature between 0° F. and 70° F., preferably to a temperature of about 20 to 40° F., and is then introduced into the lower part of tower 13 to flow upwardly through the contact material 14 therein.

The superficial velocity of the oil upward through said contact material may be increased to a rate just insufficient to prevent the passage downward by gravity of the agglomerated sludge originally dispersed in the oil by means of pump 16 and spray 15 over the top of said contact material. By superficial velocity is meant the velocity of the oil through tower 13 if it contained no contact material. As illustrative of treating various types of oils, superficial linear velocities of 10 feet per minute or higher have been used, but for optimum results velocities of 0.8 to 1.3 linear feet per minute are preferably used.

In the treatment of pressure distillate superficial velocities of 0.1 or less up to 1 linear foot per minute are preferred.

In general, the superficial linear velocities employed in the system may range from 0.1 of a foot or less, up to 10 feet or more, per minute.

The sulphuric acid used in treatment is of a concentration from about 60% acid up to and including fuming acid, preferably from about 93% acid to 98% acid, and is supplied through valve 28 and line 28a to pump 16 together with a portion of the treated oil from tower 18.

When fresh acid is supplied by pump 16 to tower 13 it is distributed in the form of a highly reactive and finely dispersed sludge over the surface of the contact material to descend by gravity therethrough in the form of an extended film covering each particle of contact material whereby the oil flowing upwardly countercurrent to the descending acid sludge is thoroughly contacted with said sludge in increased reactivity under such conditions that maximum removal of sulphur compounds is assured by selective sulphonation and polymerization thereof.

Optimum contact conditions to this end are assured in such contact tower by the provision of an infinite number of contact steps of the oil with the acid down through the tower, in each step the less treated oil coming in contact with more and more reactive acid sludge.

Additionally, in accordance with selected velocities, a prolonged period of contacting is assured so that within such period the maximum desired polymerization of sulphur compounds will take place. Also a controlled temperature gradient down through the tower is established to prevent excessive sulphonation and polymerization of unsaturated hydrocarbons desired in the finished motor fuel while removing sulphur compounds and other impurities such as gum forming and color unstable constituents.

Temperature control is established in two ways; first, by the initial cooling of the oil in cooler 12 and subsequently by cooler 19, and, second, by passage of high ratios of cooled oil with the sludge through the pumps circulating oil and sludge back from a succeeding tower to a preceding tower.

In single tower operation when processing a pressure distillate produced from California residuums of the following characteristics:

| | | | | | | | |
|---|---|---|---|---|---|---|---|
| A. P. I. gravity at 60° F | | | | | | | 59.0 |
| Sulphur | | | | | | percent | 0.70 |
| Unsaturation | | | | | | do | 22.0 |
| Engler: | | | | | | | |
| IBP | 90 | 30 | 198 | 70 | 310 | EP | 408 |
| 5 | 117 | 40 | 234 | 80 | 340 | Recov. | 98.0 |
| 10 | 131 | 50 | 264 | 90 | 370 | Res. | 1.0 |
| 20 | 164 | 60 | 290 | 95 | 390 | Loss | 1.0 | and when such is cooled to an entry temperature of 40° F. and passed into tower 13 at a rate sufficient to maintain a superficial oil velocity upward of about one foot a minute through 30 feet of one inch Raschig rings, the resultant desulphurization with 98% acid supplied through spray 15 was as follows:

| Acid rate lbs./bbl | 10 | 20 | 30 |
|---|---|---|---|
| Final sulphur | 0.30 | 0.21 | 0.04 |

Under similar conditions when using 93% acid the following results were obtained:

| Acid rate lbs./bbl | 10 | 20 | 30 |
|---|---|---|---|
| Final sulphur | 0.33 | 0.22 | 0.06 |

Due to better treating control and prolonged surface contacting, the multiple tower system, as illustrated in Fig. 2, is preferred and more efficient desulphurization is obtained. The following data was taken from multiple tower operation on a similar raw stock of 0.70% sulphur, when operating at temperatures between 30 and 40° F.

| Sulphur orig. stk. | Acid rate #/bbl. 98% | Sulphur aft. acid | Sulphur aft. rerun | Polym. loss | Percent yield treated cr. gasoline |
|---|---|---|---|---|---|
| Percent | | | | | |
| 0.70 | 20 | 0.46 | 0.13 | 8.6 | 93.1 |
| 0.70 | 15 | 0.50 | 0.20 | 6.7 | 94.5 |
| 0.70 | 10 | 0.54 | 0.30 | 4.9 | 95.9 |
| 0.70 | 5 | 0.60 | 0.46 | 2.9 | 97.2 |

The polymerization loss in the table above is based on the loss of the raw stock charge.

On examination of the above data a point of major significance is noted in that prolonged surface contacting results in a combination of sulphur removal by selective sulphonation and polymerization and of the two the latter factor is of major importance.

To illustrate further the action of the sludge and acid through the multiple tower system the curves of Fig. 3 are presented. The desulphurization efficiency of the sludge under conditions of prolonged surface contacting is apparent with maximum desulphurization by means of selective polymerization.

This treating action results in the production of sludge spent to a much greater degree than in other known processes. The following data was taken from commercial operation on high sulphur California pressure distillates. Referring to Fig. 2, the acid sludge samples were taken between towers 33 and 32, 32 and 31, and from line 62 through which the sludge is withdrawn from the system, when the 98% acid passes but once through the system.

Table A

|  | Density at 60° F. | Baumé grav. | $H_2SO_4$% by wt. |
| --- | --- | --- | --- |
| Between towers 33 and 32 | 1.32 | 35.15 | 53.8 |
| Between towers 32 and 31 | 1.22 | 26.15 | 47.6 |
| Line 62 to sludge tk. 75 | 1.16 | 20.00 | 44.8 | on another occasion when treating a highly unsaturated stock

|  | Density at 60° F. | Baumé grav. | $H_2SO_4$% by wt. |
| --- | --- | --- | --- |
| Between towers 33 and 32 | 1.260 | 29.9 | 47.4 |
| Between towers 32 and 31 | 1.229 | 27.0 | 44.8 |
| Leaving line 62 to sludge tk. 75 | 1.208 | 25.0 | 44.8 | and on a third occasion

|  | Density at 60° F. | Baumé grav. | $H_2SO_4$% by wt. |
| --- | --- | --- | --- |
| Between towers 33 and 32 | 1.312 | 34.5 | 58.1 |
| Between towers 32 and 31 | 1.183 | 22.5 | 51.1 |
| Leaving line 62 to sludge tk. 75 | 1.142 | 18.0 | 46.7 |

The Baumé gravity of the sludge will vary during treatment within the following limits.

Between towers 33 and 32 _____ 25 to 46
Between towers 32 and 31 _____ 20 to 35 }°Baumé
Leaving line 62 to sludge tk. 75 _____ 15 to 35

A regulation, or dampening effect, of the fresh acid on the oil is obtained by the regulated mixing of acid sludge with the fresh acid. With modern cracking technique designed to obtain a relatively high percentage of unsaturated hydrocarbons from petroleum for use in finished motor fuel of high anti-knock value, and as these hydrocarbons are readily attacked by sulphuric acid under various conditions, it is found that the mixing of portions of the acid sludge with the fresh acid may be beneficial in effecting selective sulphonation and polymerization on sensitive stocks whereas fresh acid alone may cause an unnecessary sulphonation and polymerization of said unsaturates. This is a special method for controlling the treatment although not normally required on ordinary oil including pressure distillate stocks.

Heretofore, it has been proposed to modify the action of the sulphuric acid by dilution with water but it is found that much better operating conditions result from dilution with acid sludge because of the peculiar properties of the acid sludge consisting of reactive acid and acid derivatives which are in themselves selective polymerizers.

The function of the circulating pumps is merely that of circulating and dispersing while maintaining a temperature control in the treating towers. This is best accomplished in making a high ratio of oil to acid, or acid sludge, in the circulating pumps, so that the rise of temperature through the pumps is a minimum. Furthermore, when on-stream flow is established, the supply of cooled oil, for instance to pump 16 from tower 18, is such that with the high ratio of oil to acid used no coolers are required immediately after the acid is injected between pump 16 and tower 13 to maintain controlled temperatures throughout the treating system.

With an entry temperature of 40° F. into tower 13 a similar tower exit temperature may be maintained. On certain stocks it may be desirable to control the outlet temperature either higher or lower than the inlet although normally a lower or like outlet temperature is preferred.

When fresh acid is injected into the suction of the circulating pump in the novel method described, pump contacting or treating can be reduced to an absolute minimum and this way maximum film contacting in towers obtained. To illustrate this point data is shown for circulating rates of ½ and 5 to one on a treat of 20 pounds of acid per barrel of oil and with 98% acid on California pressure distillate.

| Barrels P. D. charged | Barrels P. D. circulated | Temp. °F. inlet circulating pump | Temp. °F. outlet circulating pump |
| --- | --- | --- | --- |
| 100 | 50 | 40.0 | 70.5 |
| 100 | 500 | 40.0 | 45.0 |

It has been found that under low circulating rates of ½ to one or less that overtreating occurs from the abnormal acid treating rates on a small portion of the oil and desulphurization is only obtained with excessive sulphonation and polymerization losses. On the other hand, with high circulating of 5 to 1 more or less the treating in the circulating pump and connecting lines can be reduced to a minimum by the dilution effect which is equivalent to feeding the fresh acid into the oil in small increments and the treating temperatures can be controlled by direct contact with the circulated oil. For example, on a 20# per barrel treat and a circulating rate of 5 to 1 the maximum acid rate to which the oil is subjected within the circulating pump system is 4 pounds per barrel. On the multiple tower system this same principle may be used in circulating oil between the towers.

The above method of controlled acid and acid sludge contacting in circulating pumps and connecting lines is a vast improvement over other methods heretofore described and known in the art.

The following figures show desired ratios of oil to acid to minimize acid reactions in the circulating pumps and teach that there should never be an excess of acid or acid sludge in contact with the oil when sulphur removal by selective sulphonation and polymerization is desired, as opposed to sulphur removal by greater solvent action of sulphuric acid wherein sulphonation and polymerization of valuable unsaturated hydrocarbons occurs to a larger extent. The ratios in this case will be given in terms of the oil charge to the treating plant, i. e., volume of oil circulated to volume of charge. These ratios may vary from ½ to 1 or less, up to 10 to 1 or more, depending on conditions as characteristics of oil, acid rate temperatures, etc.

The temperature rise through the circulating pump depends on the acid rate and rate of circulation. When speaking of pressure distillate circulating ratios we mean the ratio of the pressure distillate circulated to the pressure distillate charged. For example, if the charge rate to the plant is 2500 barrels and the pressure distillate circulating between two towers is 5000 barrels per day the pressure distillate ratio is 2:1.

For low pressure distillate ratios, e. g. ½:1 or lower, the temperature rise across the pump may reach 30–50° F. indicating a tremendous reaction across the pump due to excessive acid and a longer agitating time. When the circulation rates on the pressure distillate go up to 5:1 or higher the temperature rise is reduced to 0°–10° F. so that the amount of reaction in the pumps is reduced to a minimum as indicated by the low temperature rise.

We prefer to circulate in ratios of about 2:1 for normal acid rates of 10 pounds per barrel, but depending on the stock being treated, the acid treat, etc., the circulation rates may vary from 1:1 or less to 10:1 or more.

The invention comprehends the utilization of the acid sludge wheresoever derived and in fact acid sludge from outside the system may be used. To this end, the acid sludge from settling tower 18 may also be wholly withdrawn together with the required volume of precooled oil and passed to pump 16. However, as the volume of sludge from tower 18 is often negligible, it may be advisable to pass the whole of it to the sludge tank 30. A sludge level M—M may therefore be permitted to form in tower 18 and a line 20a placed to withdraw the required amount of cooled oil from above such sludge level. Line 20b will then permit the addition to such cooled oil of a regulated volume of acid sludge for passage through pump 16 back to tower 13.

A similar arrangement can be made with respect to multiple tower operation shown in Fig. 2 in which the sludge from tower 34 may be passed as a whole to pump 37 through line 35, or passed as a whole to sludge tank 75, or a sludge level M'—M' may be maintained and regulated volumes of cooled oil and acid sludge may be withdrawn through lines 35a and 35b respectively.

Additional points of value in treating therefore comprise the supply of acid or sludge in predetermined volume to the suction side of the circulating pump together with an established high ratio of oil which avoids an excessive quantity of acid or acid sludge being present at any time which might overtreat a portion of the oil with consequent excessive temperature rise due to reaction at this point. At the same time high oil to acid or acid sludge ratio and the agitating effect of the circulating pumps is valuable in providing a means for dispersal and spraying of the acid particles to give a uniform distribution of the acid over the surface of the contact material in the towers.

Another valuable feature in mixing high ratios of oil to acid is to maintain the fluidity of the acid or acid sludge for effective contact and flow in the treating towers. In general, the fluidity of acid sludge varies with heat as shown.

In the following tabulation which illustrates the relative fluidities of acid sludges produced at different treating temperatures, the sludges resulted from the treatment of a California pressure distillate with 20 pounds of 98% acid per barrel. Viscosities were taken by means of a furol viscosimeter.

| Treating temperature | 60° F. | 40° F. | 20° F. |
|---|---|---|---|
| Viscosity at 100° F., furol | 75 | 65 | 58 |
| Viscosity at 40° F., furol | 800 | 500 | 400 |
| Viscosity at 0° F., furol | 5000 | 3500 | 2500 |

The above tabulation exemplifies improved fluidities in sludges produced at lower treating temperatures. Thus a limited rise in temperature is advantageous during treatment in order to obtain improved downward passage over the surface of contact material in the treating tower 13 and more efficient surface film contacting and this is aided by the controlled temperature gradient through each treating tower.

The importance then of maintaining a temperature gradient through the treating tower is apparent.

A presure sufficient to maintain sulphur dioxide or other light vapors in solution or liquid phase is held on the system by suitable back pressure valves. The pressure is normally about 10 pounds per square inch to 60 pounds per square inch, depending on the treating temperature. However, at very low temperatures or with very light stocks a pressure higher or lower than the above normal range may be required to maintain $SO_2$ or other vapors in solution and thereby decrease the velocity through the towers.

In the multiple tower system another feature is the maintaining of gradually decreasing temperatures through the system. On certain stocks it may be desirable, e. g., to treat the incoming oil with the spent sludge at 50–60° F. and then in subsequent towers decrease the temperature to 30° F. or lower temperatures. This permits maximum film contacting between the sludge and oil and a spending of the sludge to a particularly low acid content. It also enables lower temperatures to be used when the oil is approaching fresh acid treatment in the last tower. The process is extremely flexible in operation and the degree of treatment can be controlled through film and pump contacting by changes in circulating rates, temperatures, etc.

The use of higher temperatures when contacting the oil with sludge which is approaching its maximum utilization as a treating agent is sometimes advantageous since the sludge becomes increasingly viscous as it approaches saturation. Due to the viscosity characteristics of said sludge improved fluidity is obtained on increased temperature, which feature results in improved sludge action by surface contact.

Polymers which are formed during the acid treatment are separated after neutralization of the oil by fractionation during what is known as the rerunning operation.

For example, when treating a pressure distillate of 400° F. end point (A. S. T. M. distillation) the volume of bottoms which result from the distillation or rerun operation in which the overhead distillate is cut to the same volatility characteristics as the original raw oil, is called the polymerization loss. The percent polymerization loss is the volume of bottoms divided by the volume of original raw oil charged to the acid treating unit times 100.

In general, the polymerization loss may be designated as follows:

Let A = the percent oil of desired volatility characteristics in the original charge to the acid treating units.

Let B = the percent oil of similar volatility characteristics in the acid treated oil.

The percent polymerization loss is then $$= \frac{A-B}{A} \times 100$$

Pressure distillate is a fraction of oil usually resulting from the pyrolytic decomposition of hydrocarbons during what is normally termed by those skilled in the art as the cracking process, but while the invention is particularly applicable to the treatment of pressure distillate, or cracked distillate, due to the refractory nature of its contained sulphur compounds, the scope of invention is limited only by the terms of the appended claims.

We claim as our invention:

1. The process of selectively polymerizing sulphur compounds in hydrocarbon oils, which comprises: flowing a stream of oil cooled to a temperature between 0° F. and 40° F. upwardly through a series of treating towers containing contact material and simultaneously flowing a stream of sulphuric acid sludge through said towers countercurrent to said oil stream and over said contact material, cooling the oil intermediate two towers in the series, and maintaining the inlet and outlet temperatures of the oil from each tower substantially constant by passing the acid sludge from the lower part of one tower to the upper part of a succeeding tower in its direction of flow together with a volume of said cooled oil between about one-half to ten times the volume of the initial oil stream.

2. The process of selectively polymerizing sulphur compounds in hydrocarbon oils, which comprises: flowing a stream of oil cooled to a temperature between 0° F. and 70° F. upwardly through a treating tower containing contact material and simultaneously flowing a mixture of fresh sulphuric acid and sulphuric acid sludge downwardly through said contact material, withdrawing said oil from the upper part of said tower and reducing the temperature thereof, withdrawing acid sludge from the lower part of said tower, passing at least a portion of said withdrawn acid sludge to mix with said fresh sulphuric acid, and passing said mixture into the upper part of said tower together with a volume of said withdrawn oil between one-half and ten times the volume of the initial oil stream.

3. The process of selectively polymerizing sulphur compounds in hydrocarbon oils, which comprises: serially flowing a stream of oil cooled to a temperature between 0° F. and 70° F. upwardly through a series of treating towers, containing contact material and simultaneously flowing a stream of sulphuric acid and sulphuric acid sludge downwardly through said contact material in a stream countercurrent to said oil, the upper part of the last tower in the series in the direction of the flow of the oil receiving fresh sulphuric acid, mixed with acid sludge derived from a preceding tower in said direction of oil flow, together with a volume of cooled oil derived from said last tower between one-half and ten times the volume of said initial oil stream.

4. In a process of refining hydrocarbon oils with sulphuric acid in which the oil is cooled to a temperature between 0° F. and 70° F. and flowed upwardly through the units of a series of treating towers each containing contact material to be taken from the upper part of a preceding tower in its direction of flow and passed to the lower part of a succeeding tower and having its temperature reduced intermediate said units while a stream of sulphuric acid with acid sludge is flowed through said units countercurrent to said oil stream and being passed from the lower part of one unit to the upper part of a succeeding unit in its direction of flow, the combination of steps which comprises: introducing fresh sulphuric acid into the upper part of the first unit of the series in the direction of flow of the acid together with a volume of said cooled oil between one-half to ten times the volume of oil charged to said first unit and modifying the effect of the fresh sulphuric acid on said oil by the addition thereto of acid sludge derived from a succeeding unit in such series in the direction of acid flow.

5. The process of selectively polymerizing sulphur compounds in hydrocarbon oils of the motor fuel type, which comprises: serially flowing a continuous stream of the oil upwardly through each of a series of treating towers each containing contact material, simultaneously flowing a stream of sulphuric acid sludge through said towers countercurrent in each tower to said oil stream and over said contact material by passing sulphuric acid of a concentration of from about 60% up to including fuming acid into the upper part of the last tower in the series and removing the same in its serial flow from the lower part of each tower to be injected into the upper part of a preceding tower in the series, and effecting selective polymerization of the major portion of said sulphur compounds during contact of the oil and acid sludge by maintaining a temperature between about 0° F. and 70° F. in each tower and such time of contact of the oil and acid sludge therein that the gravity of the acid sludge finally removed from the first tower in the series first receiving said oil remains between about 15 to 35 degrees Baumé when a cracked California distillate of about 59 degrees Baumé is initially contacted in said last tower with sulphuric acid of about 93% to 98% concentration; said temperature being maintained by cooling the oil stream entering the towers from about 0° F. to 40° F. and passing with said injected acid sludge a volume of contacted oil between one-half and ten times the volume of the initial oil stream.

6. The process of selectively polymerizing sulphur compounds in hydrocarbon oils, which comprises: flowing a stream of oil cooled to a temperature between 0° F. and 70° F. upwardly through a plurality of treating towers containing contact material and simultaneously flowing a stream of sulphuric acid sludge through said towers countercurrent to said oil stream and over said contact material, cooling the oil intermediate two towers in the series, and maintaining the inlet and outlet temperatures of the oil from one tower substantially constant by passing the acid sludge from the lower part of a preceding tower to the upper part of said first mentioned tower in its direction of flow together with a volume of said cooled oil between about one-half to ten times the volume of the initial oil stream.

THOMAS OLIVER EDWARDS, Jr.
DAVID DEWEY STARK.